United States Patent

[11] 3,535,995

| [72] | Inventor | Vincent W. Ball |
| | | Allenhurst, New Jersey |
| [21] | Appl. No. | 735,885 |
| [22] | Filed | June 10, 1968 |
| [45] | Patented | Oct. 27, 1970 |
| [73] | Assignee | The United States of America, as represented by the Secretary of the Army |

[54] BALL SHUTTER
2 Claims, 2 Drawing Figs.

[52] U.S. Cl. ................................................... 95/58,
95/15, 352/208, 352/215
[51] Int. Cl. ......................................................... G03b 9/52,
G03b 37/00
[50] Field of Search ........................................... 95/53,
58, 15; 352/204, 208, 214, 215(Consulted)

[56] References Cited
UNITED STATES PATENTS

| 526,471 | 9/1894 | Waters | 95/58 |
| 1,540,318 | 6/1925 | Dunajeff | 352/214 |
| 2,723,609 | 11/1955 | Flora | 95/58X |
| 2,941,445 | 6/1960 | Kuhnert | 352/208X |

*Primary Examiner*—John M. Horan
*Assistant Examiner*—Robert P. Greiner
*Attorneys*—Harry M. Saragovitz, Edward J. Kelly, Herbert Berl and Milton M. Davis ABSTRACT: A shutter system for a panoramic camera that includes an annular toroidal lens or similar shaped optics wherein the shutter system includes two hollow spheres, one within the other. Each sphere has independent drive means to rotate the spheres at different speeds. Each sphere has spaced oppositely disposed peripheral slits parallel to the axis of rotation of the spheres whereby exposure is made when the slit in the outer sphere coincides with the slit of the inner sphere.

Patented Oct. 27, 1970

3,535,995

LIGHT SOURCE

INVENTOR,
VINCENT W. BALL.

BY: Milton M. Davis
Harry M. Saragovitz,
Edward J. Kelly &
Herbert Berl

ATTORNEYS

3,535,995

BALL SHUTTER

The invention described herein may be manufactured, used, and licensed by or for the Government for governmental purposes without the payment to me of any royalty thereon.

BACKGROUND OF THE INVENTION

The present invention relates generally to an improved shutter for use in panoramic cameras such as used in aerial photography. The high speed shutters that are used for annular shaped optics, and annular or toroidal optics in panoramic cameras require similar shaped shutters to expose the film. The shutter is generally located in the air space between the optical elements and operates with a reciprocal action. Because of this mechanical action and the distance travelled by the shutter the exposure time is long and can only be decreased by the use of small aperture lenses. Also because of the long exposure time image motion compensation devices and stabilized mounts are required to prevent deterioration.

In prior art devices several shutter arrangements for cameras of the kind indicated have been devised. One arrangement provides the use of a disc or series of discs provided with slots that coincide at predetermined times. Under certain operating conditions it was found that the use of a shutter including slotted discs was not advisable as it was found that such arrangement would expose the film in a scanning motion whereby one edge of the format is exposed prior to the other.

SUMMARY OF THE INVENTION

It is the general purpose of the invention to provide a shutter arrangement for annular shaped optics wherein the shutter includes and comprises two rotatable hollow spheres rotating at different speeds, one within the other and suitably slitted whereby exposure is made as the slits coincide. By such means there is provided very fast exposure time with large aperture lenses and substantially eliminates the requirement for image motion compensation and stabilization. There is also accomplished full exposure of the film upon the operation of the novel shutter herein described.

BRIEF DESCRIPTION OF THE DRAWING

The exact nature of this invention will be readily apparent from consideration of the following specification to be read in view of the annexed drawing in which.

DESCRIPTION OF THE PREFERRED EMBODIMENT

Figure 1:
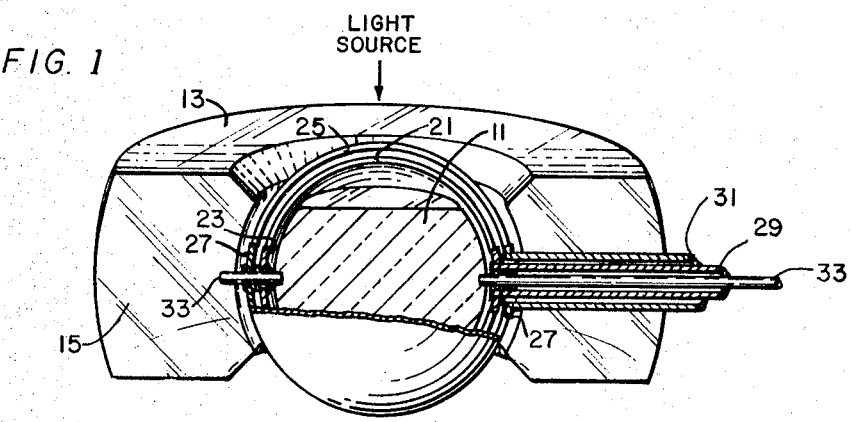
FIG. 1 is an isometric view partly in section of the ball shutter and lens in operating position.

In FIG. 1 there is shown the toroidal lens and shutter arrangement. The lens system includes a middle lens 11 and a ring lens 13. The flat surface faces 15 of the lens 13 is provided with an opaque coating so as to prevent the entry of light therethrough. Such toroidal lenses are known commerical items, and since they form no part of the invention herein any further description of characteristics and functioning of said lens need not be set forth.

Figure 2:
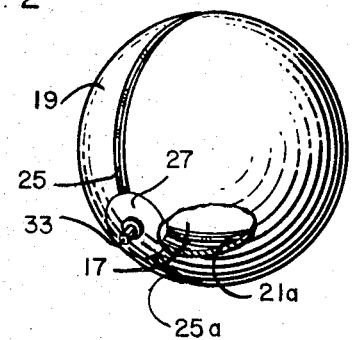
FIG. 2 is a view in perspective of the ball shutter arrangement in non exposure position.

The structural arrangement of the shutter is shown in FIGS. 1 and 2 and comprise essentially a pair of hollow spheres 17 and 19 preferably of metal with sphere 15 being slightly smaller than sphere 19 and confined and contained therein. Each of the spheres 17 and 19 is adapted to be rotated separately and at different speeds of rotation as hereinafter described. The smaller, and inner sphere 17 is provided with aligned and oppositely disposed slits 21, 21a, each of which extend about 150° in the peripheral surface of the sphere and together form two slits separated by narrow sections of the peripheral surface or wall of the sphere as indicated at 23. The outer or larger sphere 19 has an identical arrangement of slits, as sphere 17, on its peripheral surface which are designated 25, 25a, as seen in FIG. 1. The interrupted wall sections of the outer sphere 19 are shown at 27.

For effecting rotation of the spheres constituting the shutter there are provided hollow concentric shafts 29 and 31 which are suitably linked respectively to the spheres 17 and 19. The shafts 29, 31 are driven by separate drive means (not shown) at different rates of speed.

FIG. 1 shows the complete arrangement of the ball shutter, the lens, the drive shafts and the drive means for the shafts The shutter is positioned in the air space between the lens element with the axis extending through the center of the middle element 11. The middle element 11 of the lens is contained within the smaller or inner sphere 17 and held in position by a pair of opposing pins 33 that are positioned with the hollow confines of the shaft 29. It is noted that the shafts do not extend through the element 11, but only through the ring lens 13. The shafts 29 and 31 are adapted to rotate the separate spheres 17 and 19 at different speeds. Accordingly exposure is made when the slit in the outside sphere 19 coincides with the slit in the inner sphere 17 and move together through the optics. By controlling the speed of rotation of each sphere the slits can be made to coincide at various intervals thereby providing the required cycle rate. Thus the exposure time is limited only by the intensity of the light and the sensitivity of the film.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

I claim:

1. A shutter for an annular type lens, said shutter comprising a pair of rotatable hollow spheres one within the other, each of said spheres having respective oppositely disposed peripheral slits that are positioned parallel to the axis of rotation of said spheres, and means for separately rotating said spheres at different speeds whereby exposure to a light source is effected when the slits in the outer sphere coincide with the slits in the inner sphere to permit the passage of light therethrough.

2. A shutter of the kind set forth in claim 1 wherein each of the slits has a peripheral span of approximately 150°.